United States Patent [19]

McCleary

[11] Patent Number: 5,156,432
[45] Date of Patent: Oct. 20, 1992

[54] FOLDING GATE RAMP FOR PICKUP TRUCKS

[76] Inventor: Dennis M. McCleary, P.O. Box 897, 200 West Parrot Creek, Roundup, Mont. 59072

[21] Appl. No.: 836,398

[22] Filed: Feb. 18, 1992

Related U.S. Application Data

[62] Division of Ser. No. 696,020, May 6, 1991.

[51] Int. Cl.⁵ ............................................. B62D 25/00
[52] U.S. Cl. ...................................... 296/61; 296/57.1
[58] Field of Search ....................... 296/50, 51, 52, 53, 296/55, 56, 57.1, 58, 59, 60, 61

[56] References Cited

U.S. PATENT DOCUMENTS

| | | | |
|---|---|---|---|
| 1,739,335 | 12/1929 | Tangeman | 296/61 X |
| 2,821,431 | 1/1958 | Crompton | 296/57.1 |
| 3,550,801 | 12/1970 | Larson et al. | 296/61 X |
| 4,171,844 | 10/1979 | Landaal et al. | 296/57.1 |
| 4,580,828 | 4/1986 | Jones | 296/57.1 |
| 4,906,041 | 3/1990 | McKenzie | 296/61 |

Primary Examiner—Margaret A. Focarino
Assistant Examiner—Joseph D. Pape
Attorney, Agent, or Firm—Richard C. Litman

[57] ABSTRACT

A folding ramp replaces the tailgate of a pickup truck. The ramp has two congruent rectangular panels joined by knockdown hinges. The inner panel is pivotally attached to the truck just as the tailgate was. The two panels relatively rotate between an extended planar disposition for use as a ramp and a folded or sandwiched position for use as a replacement gate. The inner panel includes hardware for pivotal attachment to the bed, for latching to the ends of the sidewalls of the truck bed, and for clamping the two panels together when in the gate position. The hinges have removable pins, so that the two panels can be separated; the inner panel can then be used alone as a gate. For trucks with step bumpers, the inner panel may include an extension, comprising a cross bar pivotally attached to the truck, and two parallel telescoping arms slidingly inserted into the side members of the inner panel. The arms bridge the width of the step bumper and remain horizontal; the two panels slope down to the ground from the ends of the arms.

8 Claims, 2 Drawing Sheets

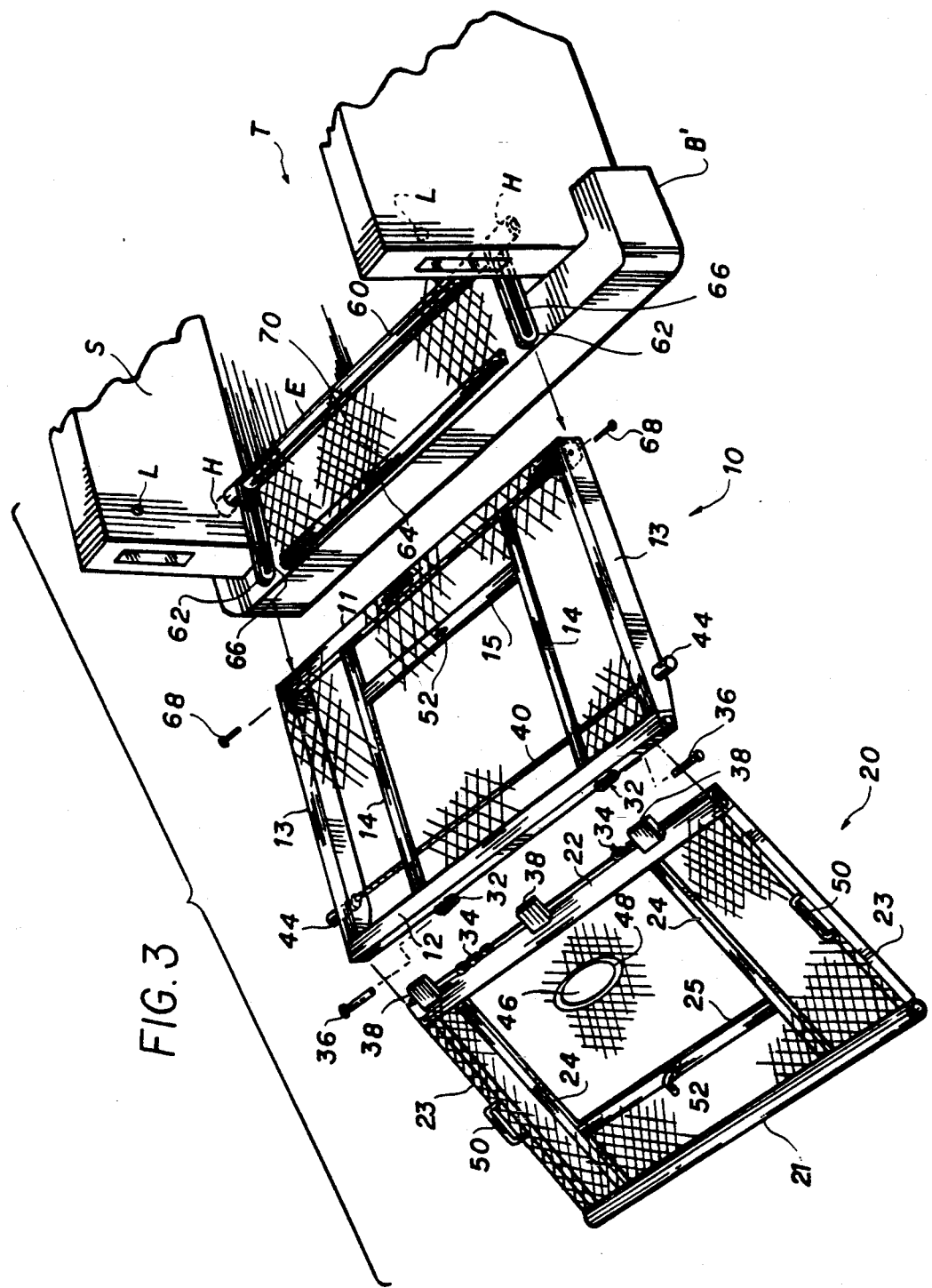

FOLDING GATE RAMP FOR PICKUP TRUCKS

CROSS-REFERENCES TO RELATED APPLICATIONS

This application is a divisional application of U.S. patent application Ser. No. 07/696,020, filed on May 6, 1991.

FIELD OF THE INVENTION

The present invention relates to convertible pickup truck ramps.

DESCRIPTION OF THE PRIOR ART

A variety of pickup truck convertible ramps are known in the prior art.

U.S. Pat. No. 3,756,440 of Raap et al. discloses a ramp comprised of two rectangular sections or panels which are hinged along their longer sides. The panels are unfolded to form a wide ramp adapted to run from the edge of the lowered tailgate to the ground, and are folded together for storage against the inside of the truck's tailgate. Special hardware is mounted onto the inside of the tailgate for holding the ramp in the two positions. The ramp is disconnected from the truck between positions.

The Raap et al panels are an open framework made up of welded tubing, which has the disadvantage that only large wheels can roll on it (small ones fall into the gaps between the tubes) and protrusions of objects slid along the ramp will tend to catch.

Stelly et al. in U.S. Pat. No. 4,478,549 disclose a ramp very similar to that of Rapp et al, but the special hardware is different. The ramp is held in its ramp position by the tailgate chains.

Lloyd, in U.S. Pat. No. 3,977,545, shows a snowmobile loading apparatus consisting of two long ramps which extend parallel both to one another and to the length of the truck bed. The ramps slide under a raised platform on the truck bed for storage.

U.S. Pat. No. 4,944,546 of Keller shows a narrow foldable tailgate/ramp combination which replaces the original tailgate. The ramp is in three rectangular panel sections which are hinged on alternate sides to fold as do accordion pleats or road maps. The middle panel includes on its bottom side a folding leg which extends to the ground when the ramp is extended for use. The leg helps to support weight on the ramp. Clamps are provided to hold the three panels together when the panels are folded together.

The plurality of panels in Keller's invention will make the ramp difficult to unfold. Also, the supporting leg is awkwardly located beneath the ramp.

A folding barrier which converts to a ramp is taught by Bennett in U.S. Pat. No. 4,596,417. It comprises three panels hinged to form a U shape: the middle panel is longer than the end panels. The three panels are proportioned so that they will surround the three open sides of the lowered tailgate and enclose the extended space above it. When in this position the tailgate acts as a bed floor extension; the short panels act as sidewall extensions, and the long panel replaces the tailgate as the vertical barrier. For use as a ramp, one short panel is laid flat on the lowered tailgate and fastened, and the other two panels serve as the ramp proper. The hinge on one ramp portion cannot be unfolded beyond a straight angle (180 degrees).

Several devices which attach to the existing tailgate are shown in the prior art.

Slater, in U.S. Pat. No. 4,884,838, shows a tailgate extension board. The board extends from the upper edge of the tailgate to the ground to act as a ramp when the tailgate is lowered. It extends from the tailgate upper edge to a mid point on the bed when the tailgate is up. The board is attached at the upper edge of the tailgate. There is only one panel element in Slater's device. Instead of folding against the tailgate in the tailgate up position, it encloses space under it. This reduces the ability of the truck bed to hold long cargo pieces.

Stenson, in U.S. Pat. No. 3,642,156, discloses a folding ramp made in four panels. The outermost panel is bolted to the existing tailgate and the other three fold into and out of the bolted panel for storage and ramp use, respectively. The multitude of telescoping members are prone to jamming and breakage. The ramp is structurally weak due to the many joints.

Curtis et al. teach the use of a bifold ramp fastened to the tailgate in U.S. Pat. No. 3,713,553. The ramp comprises two panels of unequal lengths. The two panels are hinged at their edges to fold along an axis transverse to the truck length. L-shaped brackets are bolted to the inside surface of the tailgate and extend past the upper tailgate edge, then fold over the tailgate top edge. The inner ramp panel (the panel closest to the tailgate) is hinged to the brackets at a point distant from the inner end, so that the inner panel is cantilevered. The outer panel, which is the shorter one, can be fixed parallel to the inner panel or folded flat against it. In either position, the panels are fixed by pins inserted through corresponding holes in rectangular brackets welded to either panel near the hinge.

Another convertible ramp which is fastened to the tailgate is described by Wilson in U.S. Pat. No. 3,352,440. Wilson's ramp is in two panel sections, arranged basically like the two panels of Curtis et al. But the two panels of Wilson's ramp are of equal length.

Wilson shows two embodiments. In one the inner panel is bolted to the tailgate by means of angle iron brackets. In the second, the same panel is hinged to the brackets near to the bed. In the first embodiment the panels rise above the sidewalls of the truck bed in an unsightly manner. In the second, the panels are awkward to move to the ramp position.

Wilson discloses a panel construction in which square section tubing is welded into a rectangular outline, and one side of the rectangle is then covered with open expanded metal mesh. This construction, like the open fames of the inventions discussed above, allows air to flow through the panels for decreased air resistance when the truck is moving. The mesh is an improvement in that it presents a substantially flat area for objects moving over the ramp surface, while retaining the benefits of low air resistance and self-cleaning. In the case of the Wilson invention, the beneficial air resistance effect is obviated by the tailgate itself, which remains on the truck and blocks the air. The portions of the panels extending above the tailgate only add to the existing resistance.

One U.S. patent besides that of Keller shows a ramp which does not attach to the existing tailgate, but instead, replaces it. Bernard, in U.S. Pat. No. 4,735,454, teaches the replacement of the factory-installed tailgate by a bifold ramp. The ramp has two hinged panels constructed of square metal tubing. The inner panel is pivotally fastened at the rear edge of the truck bed, as was the original tailgate. The two hinged panels unbend to form a planar ramp, and fold together to close the open end of the truck bed when held in the upright position formerly occupied by the tailgate.

The panels of Bernard are longer than the tailgate, so that when the panels are folded and upright, they rise above the level of the sidewalls. This is unsightly.

The panels are narrower than the tailgate opening, resulting in gaps between the sidewalls and the inner panel. The inner panel includes wings to close these gaps between the sidewalls and the narrow section of the inner panel. The unfolded ramp, when viewed from overhead, is thus generally T-shaped. Bernard does not teach the use of expanded metal mesh.

None of the above inventions and patents, taken either singly or in combination, is seen to describe the instant invention as claimed.

The prior art is not seen to disclose a pickup truck convertible tailgate ramp of two folding sections which does not extend above the sidewalls of the truck bed. Neither does the prior art show such a ramp whose panels are covered with open mesh for good traction and low air resistance.

Nor is there disclosed any apparatus adapted to work on a truck equipped with a step bumper. Today many trucks have these very wide bumpers, which make a great deal of the prior art unworkable. This is because they extend back into a line between the rear edge of the truck bed and the ground, which line is followed by a straight ramp.

The prior art discloses no bifold ramp/gate which comprises two generally congruent rectangular shapes, without the use of the original tailgate.

Accordingly, one object of the present invention is a two-panel bifold convertible ramp/replacement gate for a pickup truck which is easy to use, simple and inexpensive.

Another object is a convertible ramp/replacement gate which has low air resistance.

An additional object is a two-panel convertible ramp/replacement gate which includes knockdown hinges between an outer panel and an inner panel, so that the outer panel can be removed while the inner panel remains mounted to the truck.

A final object is a convertible ramp/replacement gate usable with step bumpers.

These and other objects of the present invention will become readily apparent upon further review of the following specification and drawings.

SUMMARY OF THE INVENTION

The present invention is a folding ramp which replaces the tailgate of a pickup truck. The ramp has two congruent rectangular panels joined by knockdown hinges. The inner panel is pivotally attached to the truck just as the tailgate was. The two panels relatively rotate between an extended planar disposition for use as a ramp and a folded or sandwiched position for use as a replacement gate. The inner panel includes hardware for pivotal attachment to the bed, for latching to the ends of the sidewalls of the truck bed, and for clamping the two panels together when in the gate position.

The hinges have removable pins, so that the two panels can be separated; the inner panel can then be used alone as a gate.

For trucks with step bumpers, the inner panel may include an extension, comprising a cross bar pivotally attached to the truck, and two parallel telescoping arms slidingly inserted into the side members of the inner panel. The arms bridge the width of the step bumper and remain horizontal; the two panels slope down to the ground from the ends of the arms.

BRIEF DESCRIPTION OF THE DRAWINGS

FIG. 3 is an exploded perspective view of a second embodiment of the invention, which includes a telescoping extension for use with broad step bumpers.

Similar reference characters denote corresponding features consistently throughout the attached drawings.

DETAILED DESCRIPTION OF THE PREFERRED EMBODIMENTS

Figure 1:
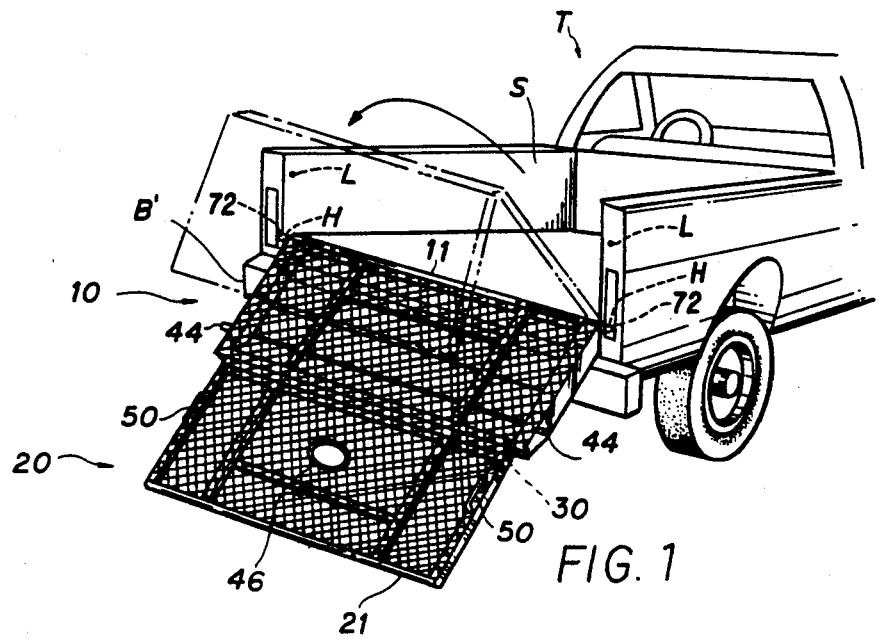
FIG. 1 is a perspective environmental view of the apparatus of the present invention in use as a ramp. An intermediate position of the apparatus is shown in phantom.

The present invention is shown in overview in FIG. 1. A pickup truck T includes a bumper B and a bed having sidewalls S adjacent the bed. The flat area of the bed ends in a rear edge E. An originally-supplied tailgate (not shown) has been removed: the present invention replaces it.

The invention is an apparatus to be used as a combination tailgate and loading ramp for a pickup truck. The apparatus converts from one to another while conveniently remaining mounted on the truck. In FIG. 1, the invention is shown in use as a ramp. The apparatus comprises two panels, a rectangular inner panel 10 and a similarly but slightly narrower outer panel 20. The two panels 10, 20 are shown in FIG. 1 in an extended planar disposition for use as a ramp; the ramp extends from the rear edge of the bed E to the ground.

The panels 10, 20 are also shown in phantom in FIG. 1 in an intermediate, partially folded position. The panels 10, 20 fold about the hinges 30 which join respective commonly aligned panel members 12, 22. When fully folded, the panel 20 lies approximately parallel to and within the panel 10. The folded panels 10, 20 will occupy the position of the original tailgate to act as a replacement gate.

Figure 2:
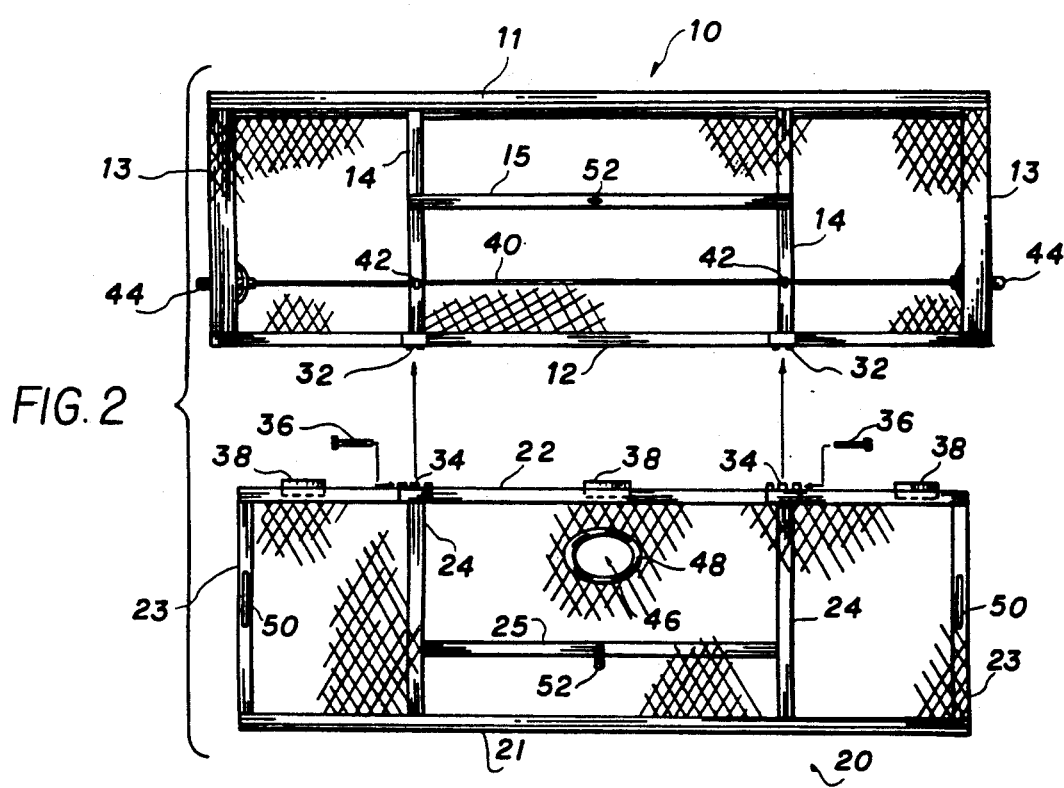
FIG. 2 is an exploded plan view of the apparatus, showing the knockdown hinges disassembled.

The two panels 10, 20 are equal in general construction as well as in size and rectangular shape, as shown in FIG. 2, except that the outer panel 20 is narrower than the panel 10 to fit within panel 10 in the folded position.

The panels 10, 20 are preferably made of square-section steel tubing. Outside tubing dimensions of 1 and 2 inches are typical.

Each of the panel frames is covered on one side with expanded metal open mesh 70. The mesh 70 is welded onto those sides of the panels 10, 20 which are upward in the ramp disposition. Because of the placement of the hinges 30, the mesh layers are on the outside of the folded panel "sandwich" formed by the juxtaposed panels 10, 20, when the apparatus is in the gate position.

The outer rectangular frames of the panels 10, 20 are made up of respective side members 13, 23; respective hinge side members 12, 22; and respective outside members 11, 21. (The side members 13 are of larger diameter than the members 23.) These members 11, 12, 13, 21, 22, which define the rectangular shapes of the panels 10, 20, are supplemented by stiffening members 14, 24 and cross members 15, 25. The stiffening members 14, 24 may be positioned generally where the wheels of an all-terrain vehicle or similar device may need support when the two panels 10, 20 are extended to the planar disposition and used as a ramp.

The knockdown hinges 30 which rotatably join the panels 10, 20 can be disassembled by removing the pins 36 which insert through the hinge plates 32, 34. The hinge plates 32, 34 may be permanently attached to the hinge side members 12, 22. Other sorts of knockdown hinges may also be used. With such hinges, the outer panel 20 can be removed and stored when the apparatus is not needed as a ramp. The inner panel 10 then remains mounted onto the truck bed for use as a gate.

The panel 10, when used as a gate, is superior to the original tailgate because the open structure of expanded metal mesh 70 allows air to flow through the gate and reduces air friction of the truck T when the truck T is in motion.

The inner panel 10 is mounted to the truck T in the same way that the original tailgate was. The particular embodiment shown in the drawing figures is adapted to replace a tailgate that was pivotally fitted into holes H in the sidewalls S. The outside member 11 of the inner panel 10 is extended past the side members 13 to fit into these holes H. The outside member 11 may be round tubing instead of square in this embodiment; otherwise round dowels; may be inserted into the ends of the outside member 11. For other trucks, other mounting methods or devices may be used.

By means of the mounting (of whatever type), the panel 10 pivots about an axis which is adjacent and parallel to the outside edge of the panel 10, and which is also parallel and close to the rear edge E of the truck T bed. The pivoting motion is just like that of the original tailgate. To hold the panel 10 upright in the position occupied by the original tailgate, a latch mechanism is needed. The latch mechanism of the embodiment shown in the figures employs retractable fingers 44 adapted to insert into latch openings L in the sidewalls S of the truck T. This prevents pivoting of the panel 10 about the holes H.

The fingers 44 are retracted by pulling on a cable 40, which runs across the bottom side of the panel 10 (the side without mesh). The cable 40 is disposed through eyes or loops 42 which act as cable guides and prevent the cable 40 from exerting sideways forces on the fingers 44, which are spring-loaded to press outward and stay within the latch holes L.

Because the cable 40 is between the two panels 10, 20 when they are sandwiched together in the gate position, and enclosed by the mesh 70, an access hole 46 is cut through the mesh 70 covering the outer panel 20. The mesh 70 is lined with a border strip 48 to prevent hand abrasion on the metal edges of the mesh.

The cable 40 is not trapped between the panel frames because the hinges 30 are of the offset or standoff type. When the panels 10, 20 are opened to their planar disposition, the hinge pins 36 are disposed above the joint line formed by the abutment of hinge side members 12 and 22 of panels 10 and 20, respectively. When the panels are in the sandwich position, the offset creates a gap between the panels 10, 20 and allows the cable 40 to run free. The offset of the pins 36 also helps to brace the panels 10, 20 against bending beyond a straight angle under the weight of objects when the apparatus is used as a ramp.

Further support against collapse of the ramp is provided by plates 38 which are welded to hinge side member 22 of panel 20. These plates 38 extend past the edge of the panel 20; when the panels 10, 20 are folded or sandwiched together in the gate position, or when they are disposed in intermediate positions, the plates 38 do not function. When the panels 10, 20 are extended into the extended planar disposition shown in FIG. 1 for ramp use, the plates 38 prevent relative rotation of the two panels 10, 20 past a straight angle, and so support weight upon the ramp.

Other means or structures that may be used to prevent collapse of the ramp are within the scope of the present invention.

Likewise, the particular mounting hardware and latching hardware illustrated in the drawing figures are not essential to the invention. Just as the panels 10, 20 may be sized to fit within the opening left by the removed tailgate, so any hardware may be used which is adapted to hold the panel 10 within that opening. Different trucks will require different hardware.

To prevent the outer panel 20 from banging against the panel 10 during motions of the truck T (while the inner panel 10 is mounted and latched in the gate position, but the outer panel 20 is only hinged to the inner panel 10) a clamp 52 is provided to clamp the two panels 10, 20 together. The clamp 52 comprises two parts mounted on the cross bars 15, 25. Any sort of clamp my be used, for example, a spring-loaded hook on the member 25 which inserts into a hole on the member 15, as shown. All that is required is that the clamp 52 hold the panels 10, 20 against separating. The clamp 52 may be mounted elsewhere than on the cross members 15, 25, or may comprise plural clamps.

Handles 50 are provided on the panel 20 for ease in grasping the apparatus.

A second embodiment of the present invention is shown in FIG. 3. This second embodiment is adapted to use with trucks having a broad "step bumper" B' extending beyond the bed. If the truck T is equipped with a step bumper B', the panel 10 will interfere with the bumper edge when the apparatus is in the ramp position. A generally U-shaped step bumper adapter is added to the first embodiment of the invention to adapt it to step bumpers.

To prevent binding, it is necessary to move the outside member 11 backward away from the bed edge E. However, the member 11 should still pivot about the axis near to the edge E when in the gate position. To allow both functions, the hollow side members 13 of the panel 10 are made open on the outside ends. Into these open ends, arms 62 are adapted to be inserted. The adaptation is by their cross-sectional size, and by their welded placement on the bar 60. The bar 60 is pivoted along the bed edge E, as the member 11 was in the first embodiment, and acts as the fulcrum.

When the panel 10 is in the gate position, the arms 62 are fully inserted into the side members 13. When the gate is opened and the apparatus is swung down to the ramp position, the panel 10 is partially, but not completely, pulled off the arms 62. When the open end of a side member 13 approaches the end of an arm 62, it must be stopped so that the apparatus does not separate. To prevent separation, a pin 68 is disposed through a hole in the side of the member 13, and into a slot 66 which is cut through the side of the arm 62. The pin 68 and slot 66 allow telescoping motion of the arm 62 within the member 13 but prevents separation.

When the two pins 68 reach the ends of the slots 66, the panel 10 is ready to be angled down as part of the ramp, and will now clear the step bumper B'. To allow the side members 13 to assume angled positions relative to the arms 62, the ends of the arms 62 are rounded, and the side members 13 are cut away on the bottom as shown.

In use, the arms 62 rest upon the upper surface of the step bumper B'. The gap between the bed edge E and the outside member 11 of slanted panel 10 is bridged by mesh 70, which is welded onto the bar 60. The other side of the mesh 70 area is stiffened by a length 64 of flat stock. When the arms 62 are fully inserted into the side members 13, the mesh 70, tipped with the length 64 of flat material, slides between the member 11 and the mesh 70 of the panel 10.

It is to be understood that the present invention is not limited to the sole embodiment described above, but encompasses any and all embodiments within the scope of the following claims.

I claim:

1. An apparatus for use as a combined tailgate and loading ramp for a pickup truck of the type having a bed, sidewalls adjacent the bed, a removable tailgate adjacent the bed, and a step bumper, said apparatus comprising:
   a rectangular inner panel including parallel hollow side members having open ends;
   a rectangular outer panel generally congruent with said inner panel;
   a knockdown hinge between said inner panel and said outer panel for folding of said inner and outer panels along respective commonly aligned panel hinge edges, said folding being between an extended planar disposition for ramp use and a juxtaposed sandwich position for gate use;
   said hinge being configured to separate said inner and outer panels when in a vertical closed gate position between said sidewalls;
   mounting means for pivotally mounting said inner panel to the bed of the truck at a rear edge of the bed to replace the removable tailgate, said mounting means enabling said inner panel to rotate about an axis parallel to an outer edge of said inner panel, said axis being adjacent and parallel to said rear edge;
   latching means for releasably holding said inner panel in said vertical closed gate position between the sidewalls;
   clamping means for releasably holding the panels together in said sandwich position;
   said mounting means includes:
      a bar coincident with said axis, said bar pivotally attached to the truck for rotation about said axis;
      parallel arms fastened to said bar, said arms slidingly inserted into said open ends for telescoping movement relative to said side members; and
      stops to prevent said arms from moving outward beyond stopped positions and thereby falling from said open ends, said stops enabling limited rotation between said arms and said side members when said arms are in said stopped positions;
   wherein, said arms may extend from said rear edge of the bed rearwardly and parallel to the bed to traverse and rest upon said step bumper, and said inner panel may slope downward from a step bumper back edge toward the ground to act as a part of the ramp;
   whereby the tailgate may be removed, said apparatus may be mounted to the truck in place thereof, and said apparatus may be either extended to the ground for use as a ramp or folded for use as a gate.

2. The apparatus according to claim 1, including means for preventing said inner panel from rotating, in a sense of rotation away from said sandwich position toward said planar disposition, beyond said planar disposition.

3. The apparatus according to claim 2, wherein said means for preventing said inner panel from rotating away from said outer panel includes location of said hinge offset from said panel hinge edges, and distant from the panels.

4. The apparatus according to claim 2, wherein said means for preventing said inner panel from rotating away from said outer panel includes plates fixed to one of the panels, said plates adapted to bear against another one of the panels when the panels are disposed in said planar disposition.

5. The apparatus according to claim 1, wherein said latching means includes a cable transversely running across said inner panel, said cable activating latches to release said inner panel from said vertical position, and a hand access hole in said second panel for pulling said cable to release said latches, said access hole disposed adjacent said cable when the panels are in said sandwich position.

6. The apparatus according to claim 1, including handles on one of the panels for moving the apparatus between said planar disposition and said sandwich position.

7. The apparatus according to claim 1, wherein:
   said apparatus including a bridging panel disposed over said step bumper to connect a top surface of the ramp with the bed of the truck.

8. The apparatus according to claim 1, wherein:
   the panels include frame members and expanded metal mesh fastened to said frame members to provide a flat surface for the panels and allow air to flow through the panels with low friction; and
   said apparatus includes a bridging panel of said expanded metal mesh disposed over said step bumper to connect a top surface of the ramp with the bed of the truck.

* * * * *